United States Patent [19]
O'Farrell

[11] Patent Number: 6,151,186
[45] Date of Patent: Nov. 21, 2000

[54] TRIM CIRCUITRY AND METHOD FOR ACCURACY IMPROVEMENT IN CURRENT SENSING FOR A VOICE COIL DRIVER OF THE TYPE USED TO MOVE READ/WRITE HEADS IN A HARD DISK DRIVE, OR THE LIKE

[75] Inventor: Patrick G. O'Farrell, Plano, Tex.

[73] Assignee: Texas Instruments Incorporated, Dallas, Tex.

[21] Appl. No.: 08/935,043

[22] Filed: Sep. 22, 1997

Related U.S. Application Data

[60] Provisional application No. 60/027,637, Oct. 3, 1996.

[51] Int. Cl.$^7$ .............................. G11B 5/55; G11B 21/12; H02P 5/00; H03F 3/16
[52] U.S. Cl. ...................... 360/78.04; 318/439; 330/253; 330/257
[58] Field of Search ................................... 360/75, 78.01, 360/78.04, 78.06, 78.07, 78.08, 78.12, 78.13; 318/254, 138, 439; 330/146, 277, 293, 291, 252, 253, 254, 257

[56] References Cited

U.S. PATENT DOCUMENTS

| | | | |
|---|---|---|---|
| 5,113,147 | 5/1992 | Klein | 330/253 |
| 5,191,297 | 3/1993 | Penman et al. | 330/146 |
| 5,416,646 | 5/1995 | Shirai | 360/46 |
| 5,444,579 | 8/1995 | Klein et al. | 360/67 |
| 5,455,816 | 10/1995 | Bitting | 369/124 |
| 5,493,189 | 2/1996 | Ling et al. | 318/254 |
| 5,867,001 | 2/1999 | Lagerquist et al. | 318/439 |
| 5,877,914 | 3/1999 | Gontowski, Jr. | 360/78.12 |

FOREIGN PATENT DOCUMENTS

| | | |
|---|---|---|
| 0 693 749 A1 | 7/1994 | European Pat. Off. |
| 08-163 885 | of 1995 | Japan |

*Primary Examiner*—David L. Ometz
*Attorney, Agent, or Firm*—W. Daniel Swayze, Jr.; W. James Brady, III; Frederick J. Telecky, Jr.

[57] ABSTRACT

A circuit (10) and method for providing a drive current to a voice coil (20) to position a head (13) of a disk drive (14) includes driver circuitry (68, 70) for controlling currents flowing in the voice coil (20) and at least one sense current circuit (92), which may include FET devices (112, 114, 116, 118), for sensing and controlling the currents in a current path (26) of the driver circuit (10). Programmable circuitry (170) is connected to adjust at least one of the sense current circuits (112, 114 or 116, 118) to control a current flowing through the voice coil (20) to position the head (13) to a desired location. A trim capability is implemented by providing one or more trim FETs (145–148, 155–158) that are selectively connectable in parallel with current mirroring FETs (120, 126), which may be, for example, FETs connected to mirror a current in one of the current flow paths (26) of the drive circuit (10). By such selective connection, an effective channel width provided by the FET devices (120, 145–148 or 126, 155–158) can be selectively provided, thereby enabling the current in the voice coil (20), and therefore the position of the head (13) controlled by the voice coil (20) to be adjustable.

2 Claims, 2 Drawing Sheets

TRIM CIRCUITRY AND METHOD FOR ACCURACY IMPROVEMENT IN CURRENT SENSING FOR A VOICE COIL DRIVER OF THE TYPE USED TO MOVE READ/WRITE HEADS IN A HARD DISK DRIVE, OR THE LIKE

This appln claims the benefit of U.S. Provisional No. 60/027,637 filed Oct. 3, 1996.

BACKGROUND OF THE INVENTION

1. Field of the Invention

This invention relates to improvements in driver circuits and methods for voice coils of the type used to move read/write heads in a disk drive of the type used in computer systems, or the like, and more particularly to improvements in circuitry and methods for sensing currents in power driver transistors for a voice coils in a disk drive system, and still more particularly to improvements in circuits and methods for improving the accuracy of current sensing for voice coils in a disk drive systems and for positioning the heads controlled thereby.

2. Relevant Background

Typical disk drives, such as those used in floppy, hard and CD-ROM disk drives used personal computers, or the like, have one or more rotating disks onto which data can be selectively recorded and read. Typically, CD-ROMs have one or more rotating disks onto which data has been optically pre-recorded, which can only be read; however, recently, CD-ROM system have been introduced in which data can be written to an optical disk, which is nevertheless referred to as a "CD-ROM". In all such disk drives, however, one or more heads that record and read data, in the case of a magnetic disk drive, or merely detect data, in the case of a CD-ROM drive, are provided. In either case, the heads are typically carried on an arm assembly that is selectively positionable to any one of a number of circular data paths arranged at different radii of the disk from the spindle on which the disk is carried.

The arms on which the heads are carried, and, therefore the heads themselves, are moved along a line extending across the disk radii by a so-called "voice coil". By applying a current of known magnitude and polarity to the voice coil, the heads can be selectively positioned anywhere on the line relative to the disk.

In a typical system, the currents to the voice coil are controlled by a current driver circuit that includes four driver transistors. The driver transistors may be, for example, FET devices, connected to form an "H" bridge between a supply voltage, or $V_{CC}$, and ground, with the voice coil being connected between the legs of the "H" and with each driver transistor connected in a respective upright of the "H". The FET devices connected to the supply voltage and the respective sides of the voice coil are generally referred to as the "high side drivers," and the FET device connected between the respective sides of the voice coil and ground are generally referred to as the "low side drivers." The respective high and low side drivers of each leg of the driver are generally controlled by the outputs of two oppositely driven power amplifiers.

The most common approach for controlling the movement of the heads is to use a sense resistor in series with the voice coil to sense the current flowing in the voice coil. The sensed currents are fed back to the driver amplifiers to enable the currents in the voice coil to be precisely controlled. Using sense FETs to sense the current in the coil reduces the resistive drop in the voice coil, which allows the customer to supply more current to the coil.

Thus, to detect the currents flowing in the power transistors in the current flow paths of the motor, FET devices may be connected as current mirrors to mirror the current in the power transistors. The mirror transistors are typically made small compared to the size of the power transistors, ratios of 15/1 being typical. It is, however, desirable to make the mirror transistors very small in comparison to the power transistors, but design tolerances result in greater imprecision amongst various mirroring transistors as the size ratio increases.

Nevertheless, the use of such FET mirror devices often produces poor accuracy because of the large size difference between the power devices and the mirror devices. Normally current flowing through one transistor can be mirrored to another transistor with relatively good accuracy if the devices are of similar size. In voice coil applications, however, in power FET devices, amps of current flow in the primary devices, and it is desirable to use a large ratio (on the order, for example, of 1500:1) between the power FET and the mirror device. If a smaller ratio were to be used, a large amount of power would be wasted in the control circuitry because of the large current in the mirror device. However, with a mirror ratio on the order of 1500:1, the accuracy if the mirror will not be very good, and can be expected to vary on lot and device basis.

In addition, the problem is complicated in that voice coil driving circuits may require multiple gain ranges, for example, three or more ranges, depending upon the particular system. These gain ranges allow the DAC that controls the voice coil loop to operate with equal accuracy over several ranges of coil current. Thus, if sense FET technology is used, as the feedback current becomes increasingly smaller, and potentially less accurate as the coil current approaches zero, many voice coil circuits increase the gain of the feedback current. In this manner, the current mirrors in the feedback block are not forced to handle currents from a few microamps to a few hundred microamps. This helps the matching of the current mirrors and, consequently the accuracy of the current control. Thus, in the past, the mirroring of the current in the driving transistors has been inaccurate, particularly at the low current levels that may be experienced in variable gain voice coil driving circuits.

What is needed, therefore, is a circuit and method that provide sensing current accuracy through mirror transistors of relatively small size, which may be used in conjunction, if desired, with circuitry to provide multiple gain ranges in which the feedback circuitry operates.

SUMMARY OF THE INVENTION

In light of the above, therefore, it is an object of the invention to provide a circuit and method to provide a circuit having, and method for, sensing current accuracy in a voice coil driving circuit through mirror transistors of relatively small size.

It is another object of the invention to provide a circuit and method of the type described, which may be used in conjunction, if desired, with circuitry to provide multiple gain ranges in which the feedback circuitry operates.

These and other objects, features and advantages of the invention will be apparent to those skilled in the art from the following detailed description of the invention, when read in conjunction with the accompanying drawings and appended claims.

According to a broad aspect of the invention, a method is presented for providing a drive current to a voice coil to position a head of a disk drive. The method includes measuring a first current that is applied to the voice coil and mirroring the first current to provide a sense current that is proportional to the first current. The method also includes using the sense current to modify a magnitude of the first current in a feedback circuit to position the head closely to a desired position and adjusting the sense current to more closely equal a desired magnitude, to position the head more closely to the desired position. The current, for example, may be adjusted to force the current in the voice coil as close as zero as possible when the heads are located in the desired position.

The step of adjusting the sense current may be performed by selectively connecting at least one active device having a current path in parallel with an active device connected to mirror a current in a power transistor. This may be done, for example, by selectively connecting a trim FET having a first channel width to length ratio in parallel with a current mirror FET having a second channel width to length ratio. The step of adjusting the sense current may be performed by programmable means, if desired, to select or deselect the trim FET to force the current as closely as possible to the desired current. The method may be used in an environment in which a gain of the driver circuit may be changeable.

According to another broad aspect of the invention, circuit is provided that is connectable to operate a voice coil to position a head of a disk drive system. The circuit includes a driver circuit for controlling currents flowing in the voice coil and at least one sense current circuit, which may include FET devices, for sensing and controlling the currents in respective current paths of the driver circuit. Programmable circuitry is connected to adjust at least one of the sense current circuits to control a current flowing through the voice coil to position the head to a desired location.

A trim capability is implemented by providing one or more trim FETs that are selectively connectable in parallel with the a current sensing FET, which may be, for example, an FET connected to mirror a current in one of the current flow paths of the drive circuit. By such selective connection, an effective channel width provided by the FET devices can be selectively provided, thereby enabling the current in the voice coil, and therefore the position of the head controlled by the voice coil to be adjustable.

According to yet another broad aspect of the invention, a driver circuit is presented for providing drive signals to a voice coil for positioning a head of a disk drive system. The driver circuit includes first and second current paths, each connected between a supply voltage and a reference potential. Each of the current paths has two driver transistors, the voice coil being connectable between the driver transistors in respective current flow paths. At least one sensing transistor is connected to produce a mirror current which mirrors a current in an associated driver transistor. Circuitry is provided that is responsive to the mirror currents of the sensing transistors to control the amplitudes of the currents in the associated driver transistor in the respective current flow path. At least one trim transistor is connected in parallel with a respective one of the sensing transistors, and a programmable circuit is provided that is connected to selectively activate the at least one trim transistor to adjust the amplitudes of the mirrored currents in the current flow path with which the sensing transistor with which the at least one trim transistor is associated.

According to another broad aspect of the invention, a disk drive system is presented. The hard disk drive system includes a spinning data media, which may be a magnetic floppy disk, a magnetic hard disk, a CD-ROM, or the like. At least one head is selectively positionable for at least reading data from the spinning data media, and a voice coil is arranged for positioning the head in response to currents in the voice coil. First and second current paths are each connected between a supply voltage and a reference potential. Each current path includes two driver transistors, with a node between each of the driver transistors in each of the current paths being connected to a respective end of the voice coil. A plurality of sensing transistors are each connected to produce a mirror current which mirrors a mirrored current in an associated driver transistor in a respective current flow path, and circuitry responsive to the mirror currents of the sensing transistors controls the amplitudes of the currents in the associated driver transistor in a respective current flow path. At least one trim transistor is connected in parallel with a respective one of the sensing transistors, and a programmable circuit is connected to selectively activate the at least one trim transistor to adjust the amplitudes of the mirrored currents in the current flow path with which the sensing transistor with which the at least one trim transistor is associated.

BRIEF DESCRIPTION OF THE DRAWING

The invention is shown in the accompanying drawing, in which.

In the various figures of the drawing, like reference numbers are used to denote like or similar parts.

DETAILED DESCRIPTION OF THE PREFERRED EMBODIMENTS

Figure 1:
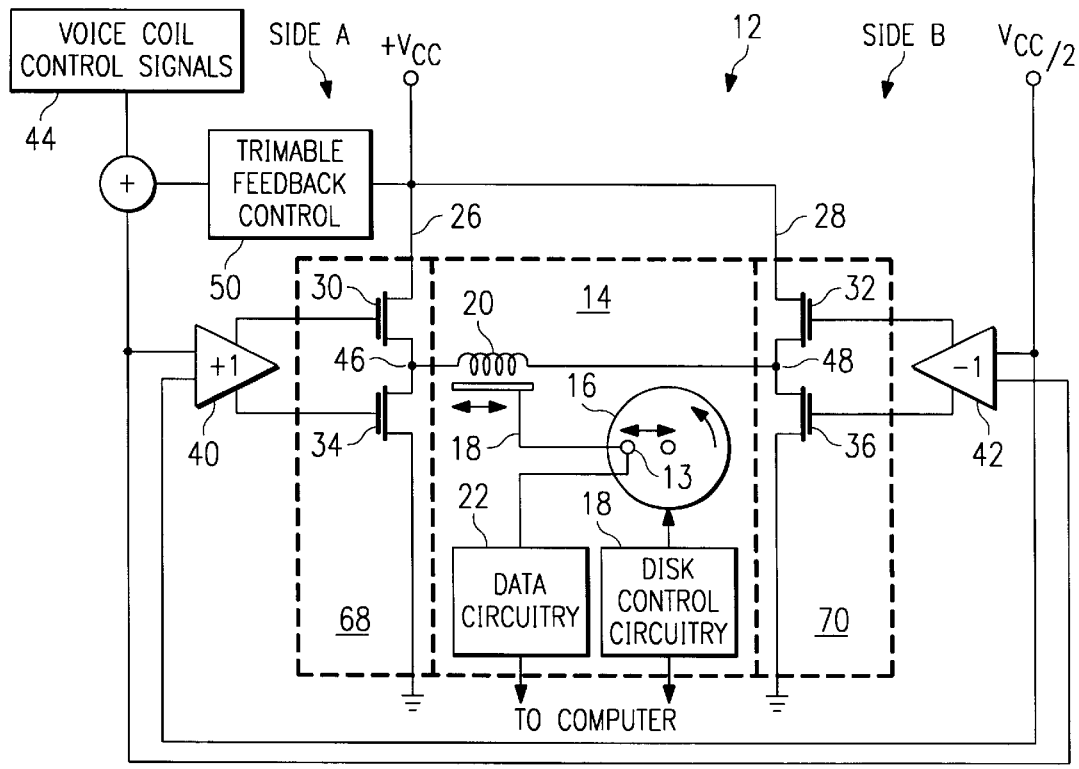
FIG. 1 is an electrical schematic diagram of a portion of a disk drive system incorporating trimable current sensing circuitry for controlling the head positioning currents in a voice coil in the disk drive system, in accordance with a preferred embodiment of the invention.

With reference now to FIG. 1, an electrical schematic diagram 10 of a portion of a voice coil driver circuit 12 for positioning the read/write heads 13 of a disk drive system 14 are shown. Although the disk drive system 14 shown is of the type typically found in use in conjunction with a hard disk drive, it should be understood that the invention has equal applicability for use in conjunction with disk drive systems of other types, such as floppy disk drive systems, CD-ROM systems, and the like.

The disk drive system 14 illustrated includes a rotating medium 16, which may be a rotating platter having a magnetic medium formed thereon, for example. The rotating medium 16 may be spun by a three-phase polyphase dc motor system, not shown, which may be controlled by a disk control circuitry 18.

The head 13 is moved to a selective position along a radii of the rotating medium 16 by a control arm 18, which is similarly laterally moved by currents applied to a voice coil 20. Data that is to be written to or read from the rotating medium 16 by the heads 13 is controlled by data circuitry 22 under the control of an associated computer, not shown. It should be noted that the disk drive assembly, and in particular the voice coil 20 may be provided separately from the driver circuitry 12 to which it is connected.

The driver circuitry 12 shown is of the type generally known as an "H" bridge, and includes two current paths 26 and 28 on respective sides of the "H" bridge, denoted as side "A" and side "B." In the embodiment shown, each side has a respective high side driver transistor 30 and 32, and a respective low side driver transistor 34 and 36 connected between $V_{CC}$ and ground. The gates of the driver transistors 30–36 are connected to drive amplifiers 40 and 42 to be controlled by signals from the voice control signal source 44. The voice control signals from the voice coil control signal source 44 are connected in opposite fashion to the amplifiers 40 and 42 so that the respective driver transistors 30–36 are oppositely driven. Thus, the difference in the currents in each of the current paths 26 and 28 on opposite sides of the nodes 46 and 48 to which the voice coil 20 is connected represents the current that is applied to the voice coil 20 for positioning the heads 13.

A trimable feedback control circuit 50 is connected between the current flow path 26 and the signals from the voice coil control signal source 44 to control the signals that are applied to the driver amplifiers 40 and 42. The trimable feedback control circuit 50 serves to produce a feedback current that is proportional to the drive current in the current flow path 26 on side A of the driver circuitry 12. The feedback current generated by the trimable feedback control circuit 50 serves to cancel the voice control signals when the head 13 is in its desired position, ideally, driving the current in the voice coil 20 to zero (or other desired quiescent current value).

Figure 2:
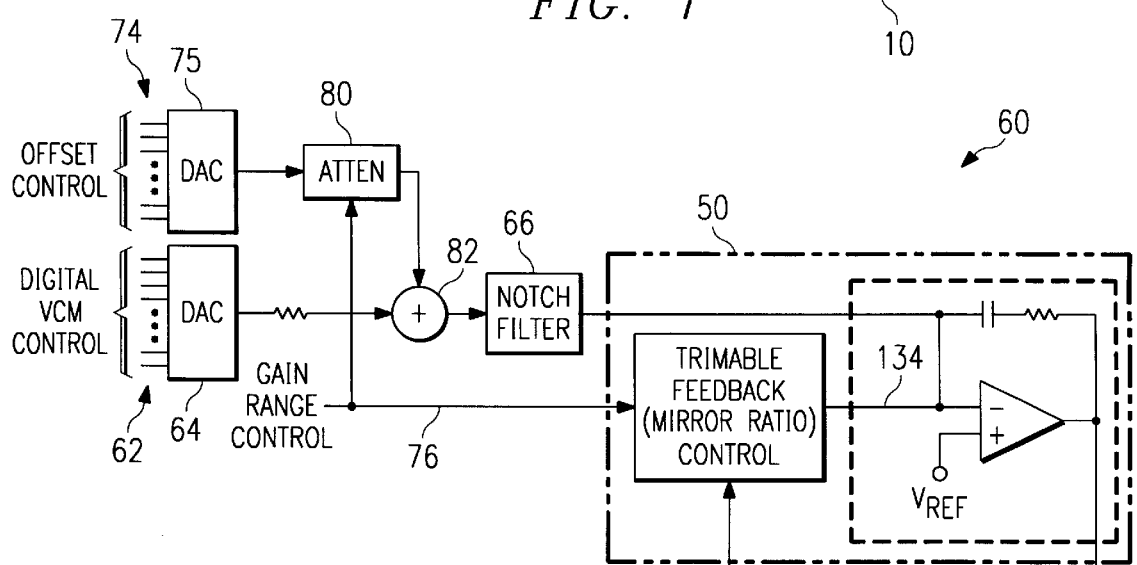
FIG. 2 is an electrical schematic diagram of a typical arrangement of trim circuitry of the type used in the disk drive system of FIG. 1, in accordance with a preferred embodiment of the invention.

With reference now additionally to FIG. 2, a typical circuit 60 utilizing the trimable feedback control circuit 50, described above, is illustrated. The circuit 60 provides drive signals to the voice coil 20, according to the digital drive signals 62 at an input to the circuit.

More particularly, the digital input signals 62 are converted by a digital-to-analog converter 64 to analog signals that are filtered by a notch filter 66. The output from the notch filter 66 is modified by the output from the feedback control circuit 50 (a part of which that has been separated from the general circuitry being shown in contained in a dotted line portion of box 50), and is applied to the inputs of the driver amplifiers 40 and 42. The outputs of the driver amplifiers 40 and 42 are applied to respective driver transistor circuits 68 and 70, respectively on sides A and B of the "H" bridge driver circuitry, in a fashion similar to that shown in FIG. 1, described above.

The output from the driver transistor circuit 68 is derived from a mirror circuit, below described, for application to the trimable feedback control circuit 50, which produces an output that is subtracted from the control signal at the output of the notch filter 66. As mentioned, an object of the feedback circuitry is to generate a signal that will force the current in the voice coil to zero in a quiescent state.

Also shown in the circuit 60 of FIG. 2 are an optional digital offset control input signal 74 and an optional gain range control signal 76. The digital offset control input signal 74 are converted to an analog signal by a digital-to-analog converter 75 to provide a controllable voltage offset value to the drive signals that are applied to the voice coil 20, and the gain range control circuit varies the gain range of the feedback control circuit 50, as described in greater detail below. If the digital offset control input signal 74 and gain range control signal 76 signals are used, the output from the DAC 75 may be may be appropriately attenuated by an attenuator 80, in accordance with the range specified by the range control signal 76. The appropriately attenuated offset signal is added to the output from the digital VCM control DAC 64 in an adder 82, prior to being input into the notch filter 66.

Figure 3:
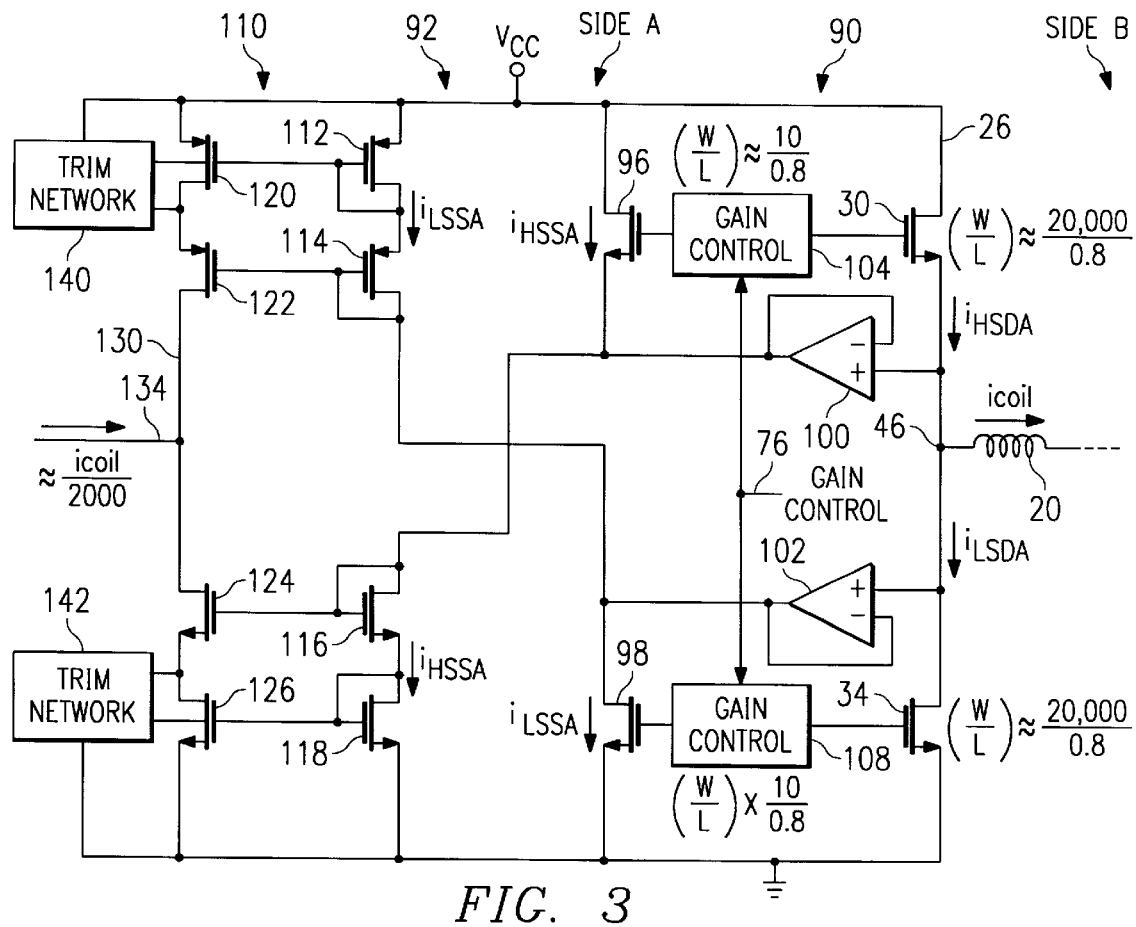
FIG. 3 is an electrical schematic diagram of a typical FET mirror circuit arrangement together with trim circuitry of the type used in the disk drive system of FIG. 2, in accordance with a preferred embodiment of the invention.

Details of the current sensing circuitry is shown with additional reference now to the current sensing circuitry 90 of FIG. 3. The portion of the driver circuit shown in FIG. 3 corresponds to the portion on side A in FIG. 1, and illustrates a current mirroring circuit 92 that mirrors the current in the current flow path 26 above and below the node 46. More specifically, the mirror circuitry 92 includes mirror transistors 96 and 98, having drains and gates connected to the respective drains and gates of high and low side driver transistors 30 and 34. The source of the high side driver transistor 30 is connected to the source of the mirror transistor 96 by an amplifier 100. Similarly, the source of the low side driver transistor 34 is connected to the source of the mirror transistor 98 by an amplifier 102. The width to length ratios of the driver transistors 30 and 532 are about 20,000:0.8, and the width to length ratios of the mirror transistors 96 and 98 are about 10:0.8.

As shown, optional gain range control circuits 104 and 108 are connected in between the gates of the high and low side driver transistors 30 and 34 and the gates of their respective current mirror transistors 96 and 98. The gain range control circuits 104 and 108 receive the gain range control signal 76, described above, and may be, for example, include a series of FET devices (not shown) selectively connectable in parallel with the respective mirror transistors 96 and 98, in accordance with the value of the gain range control signal 76.

The currents, labeled $i_{HSSA}$ and $I_{LSSA}$, respectively flowing in the high and low side mirror transistors 96 and 98 are further mirrored in mirror circuit 110. More particularly, two transistors 112 and 114 are connected in series between $V_{CC}$ and the low side mirror transistor 98, wherein the same current, $I_{LSSA}$, flows therethrough. The drains and gates of transistors 112 and 114 are each interconnected. Likewise, two transistors 116 and 118 are connected in series between ground and the high side mirror transistor 96, wherein the same current, $I_{HSSA}$, flows therethrough. The drains and gates of transistors 116 and 118 also are each interconnected.

Mirror transistors 120 and 122 are connected to mirror the currents in respective transistors 112 and 114, and, similarly, mirror transistors 124 and 126 are connected to mirror the currents in respective transistors 116 and 118. It can be seen that the current that flows in the current flow path 130 comprising transistors 120, 122, 124, and 126 is a ratioed value approximating the current difference on each side of node 46 connected to the voice coil 20. The value of the current in the flow path 130 can be made to be approximately equal to the current flowing in the voice coil, $i_{COIL}/2000$, with appropriate transistor sizing. The current on output line 134 provides the feedback current that is fed back to control the current in the voice coile 20, as described above with reference to FIG. 2.

Figure 4:
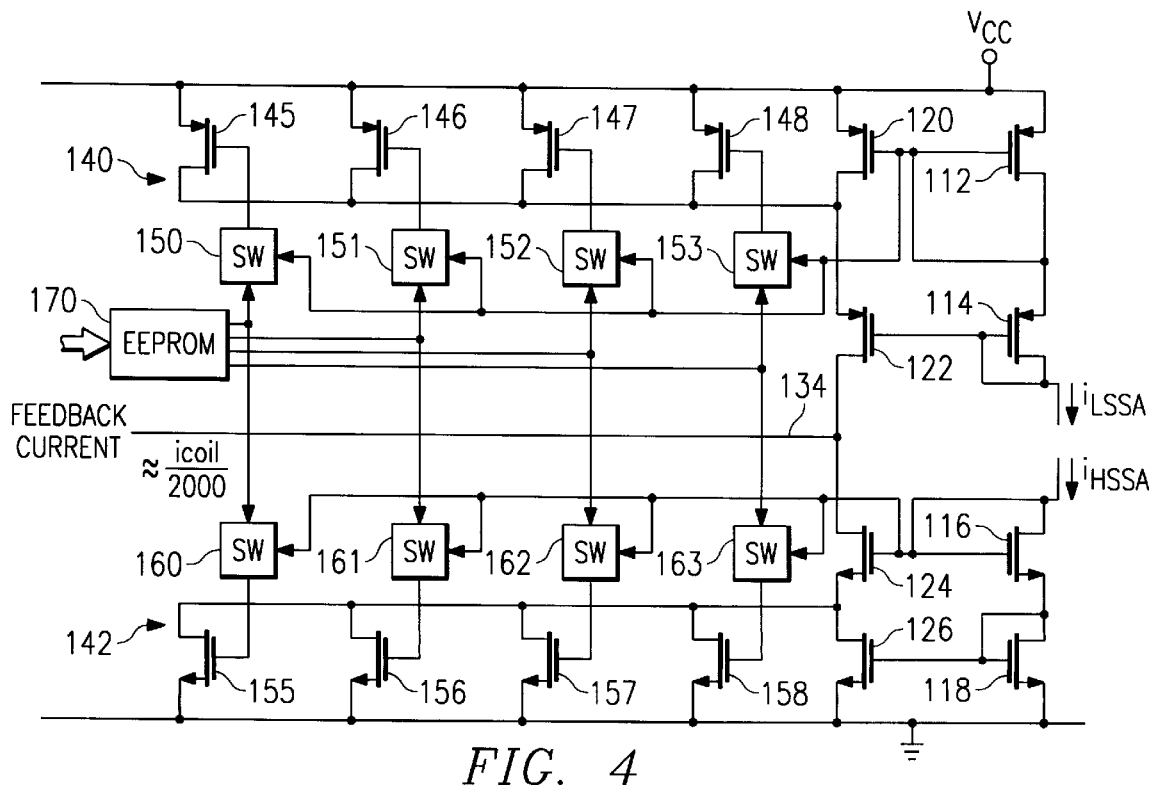
FIG. 4 is an electrical schematic diagram of trim circuitry used in conjunction with the FET mirror circuit of FIG. 3, in accordance with a preferred embodiment of the invention.

To further control the value of the feedback current, which may otherwise vary because of the large size differences between the mirror transistors and the driver transistors, manufacturing tolerances, and other factors, trim networks 140 and 142 are provided to controllably vary the current that flows through respective mirror transistors 120 and 126. The trim networks 140 and 142 are described in greater detail in FIG. 4, to which reference is now made.

More specifically, the trim networks 140 and 142, according to a preferred embodiment of the invention, include a number of FET transistors that are selectively connectable in parallel with the respective low side mirror transistor 120 and high side mirror transistor 126. The trim network 140, for example, includes four transistors 145–148, each connected with its source connected to the source of the mirror transistor 120 and its drain connected to the drain of the mirror transistor 120. The gates of the transistors 145–148 may be selectively connected to the gate of the mirror transistor 120 by a respective switch 150–153, which may be controlled by a programmable device, such as the EEPROM 170 shown.

The trim network 142 includes four transistors 155–158, each connected with its source connected to the source of the mirror transistor 126 and its drain connected to the drain of the mirror transistor 126. The gates of the transistors 155–158 may be selectively connected to the gate of the mirror transistor 126 by a respective switch 160–163, which may be also controlled by the EEPROM 170.

As mentioned, the FET devices 120 and 126 are controlled by the programmed outputs of an EEPROM circuit 170. The effective channel width of the mirror devices 120 and 126 are thus controlled by the EEPROM 170, which may be constructed on the same chip as the remainder of the sense and trim circuitry. Ordinarily, the EEPROM 170 would be configured at a factory or manufacturing site; however, it may be user programmable, if desired. It will be appreciated that the function performed by the EEPROM 170 may also be performed by other programmable circuitry, such as programmable fuse devices, programmable gate devices, or the like.

The adjustable FET devices 120 and 126 may provide a plurality of differently sized FET devices, which may be individually, selectively connected in parallel. It should be noted that any number of devices may be employed, depending upon the application and resolution of sense current adjustment that is necessary or desired. It should also be noted that although the invention is desirably aimed at forcing the current in the voice coil 20 to zero, or other predetermined value, the discreet trimming by selective switching into the parallel circuits 140 and 142 of one or more transistors necessarily results in quantized steps in trimming the circuitry. Consequently, the number of transistors that are switchably connected controls the resolution by which the currents can be made equal. In the embodiment illustrated, for example, the FET devices 145–148 and 155–158 may have respective sizes of $\frac{1}{1}$, $\frac{1}{2}$, $\frac{1}{4}$, and $\frac{1}{8}$. (The ratio expressed represents the width-to-length ratio of the gate of the FET devices.) This gives a trim range of ±10% with a step size of 1%.

Thus, depending upon the programmable states appearing on the output terminals of the EEPROM 170, selected ones of the FET devices 145–148 and 155–158 are turned on together with the FET devices 120 and 126, which are not selectively controlled by the EEPROM 170. It should be noted that in a normal or default state, one or more of the FET devices 145–148 and 155–158 may normally be turned on to enable the flexibility to have a reduced current carrying capability from the nominal state. Thus, for example, FET devices 148 and 158 may normally be in a default or initial on state to be essentially in parallel with the mirror transistors 120 and 126. Thus, if a smaller feedback current 134 is desired, the FETs 148 and 158 may be turned off, leaving only the FET mirror transistors 120 and 126 to be turned on. Alternatively, if a higher feedback current 134 is desired, one or more of the remaining FET transistors 145–147 and 155–157 may be turned on, as needed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit connectable to operate a voice oil to position a head of a disk drive system, comprising:

a driver circuit for controlling a first current in a first current path and a second current in a second current path flowing in said voice coil;

a plurality of sense current circuits for sensing and controlling the first current and the second current in respective said first and second current paths;

programmable circuitry connected to adjust at least one of the sense current circuits to control a current flowing through said voice coil to position said head to a desired location;

wherein said sense current circuits comprise FET devices; and wherein said FET devices are connected in parallel, and said programmable circuit programmably selects said FET devices to control an effective channel width provided by said FET devices.

2. A circuit connectable to operate a voice coil to position a head of a disk drive system, comprising:

a driver circuit for controlling a first current in a first current path and a second current in a second current path flowing in said voice coil;

a plurality of sense current circuits for sensing and controlling the first current and the second current in respective said first and second current paths;

programmable circuitry connected to adjust at least one of the sense current circuits to control a current flowing through said voice coil to position said head to a desired location;

wherein said sense current circuits comprise FET devices; and wherein said FET devices are connected in parallel, and said programmable circuit programmably selects said FET devices to control an effective channel width provided by said FET devices by selectively connecting a trim FET having a first channel width to length ratio in parallel with a FET having a second channel width to length ratio.

* * * * *